United States Patent [19]

Borg

[11] 4,192,623

[45] Mar. 11, 1980

[54] ADJUSTABLE JOIST HANGER

[76] Inventor: Carl W. Borg, 1040 Garland Ln., Wayzata, Minn. 55391

[21] Appl. No.: 872,385

[22] Filed: Jan. 26, 1978

Related U.S. Application Data

[63] Continuation of Ser. No. 807,504, Jun. 17, 1977, abandoned, which is a continuation of Ser. No. 617,498, Sep. 29, 1975, abandoned.

[51] Int. Cl.² .............................................. E04G 21/00
[52] U.S. Cl. .................................. 403/232.1; 52/126; 52/702; 249/23; 249/211
[58] Field of Search ................ 52/702, 708, 632, 126; 403/232.1, 230, 182; 248/214, 215, 300; 249/23, 211

[56] References Cited

FOREIGN PATENT DOCUMENTS

| | | | |
|---|---|---|---|
| 182520 | 12/1954 | Austria ................................. 403/232.1 |
| 186835 | 9/1956 | Austria ..................................... 52/632 |
| 872851 | 2/1953 | Fed. Rep. of Germany ............. 52/632 |
| 729650 | 5/1955 | United Kingdom ....................... 52/632 |

*Primary Examiner*—James A. Leppink
*Assistant Examiner*—Henry E. Raduazo
*Attorney, Agent, or Firm*—Merchant, Gould, Smith, Edell, Welter & Schmidt

[57] ABSTRACT

A joist hanger including a body with a supporting lip and with ribs for removably carrying a joist support, the body being arranged to removably receive a clamping member for securing the hanger to the upper flange of a steel beam. Also included is the method of constructing concrete decks made possible by the characteristics of the hanger.

17 Claims, 6 Drawing Figures

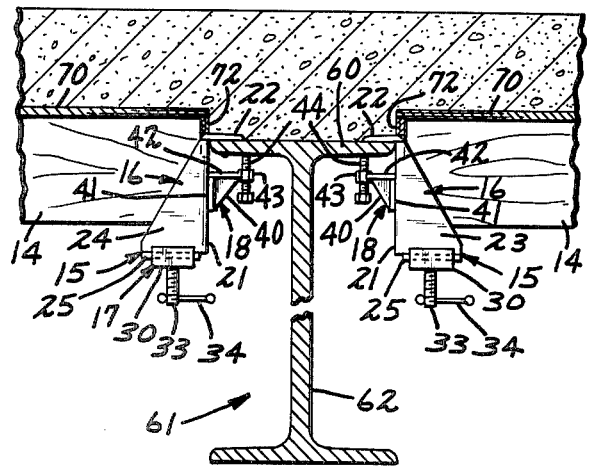
FIG. 2
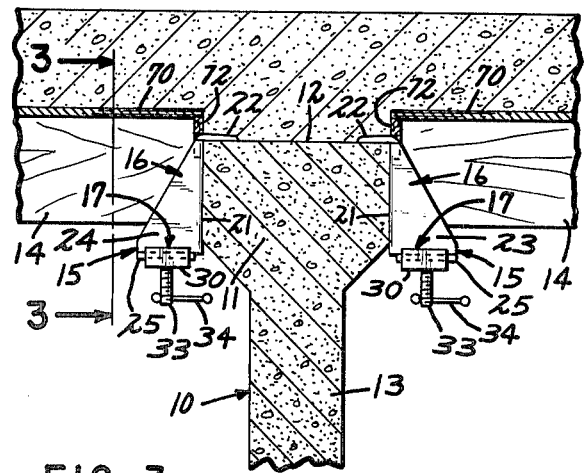
FIG. 1
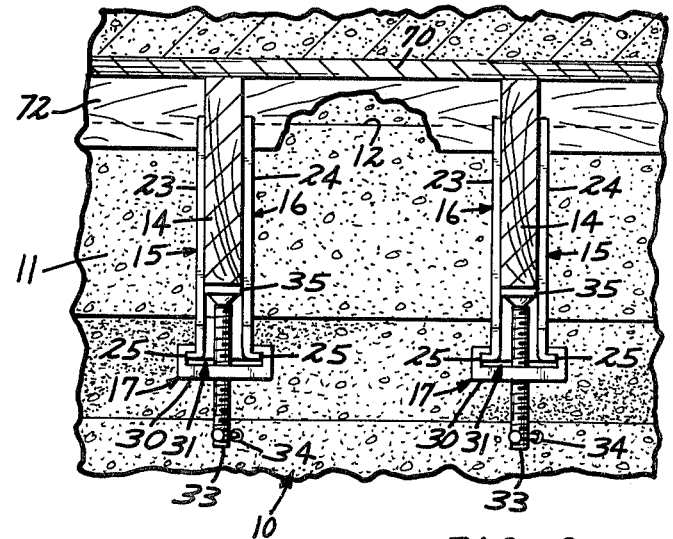
FIG. 3
FIG. 5
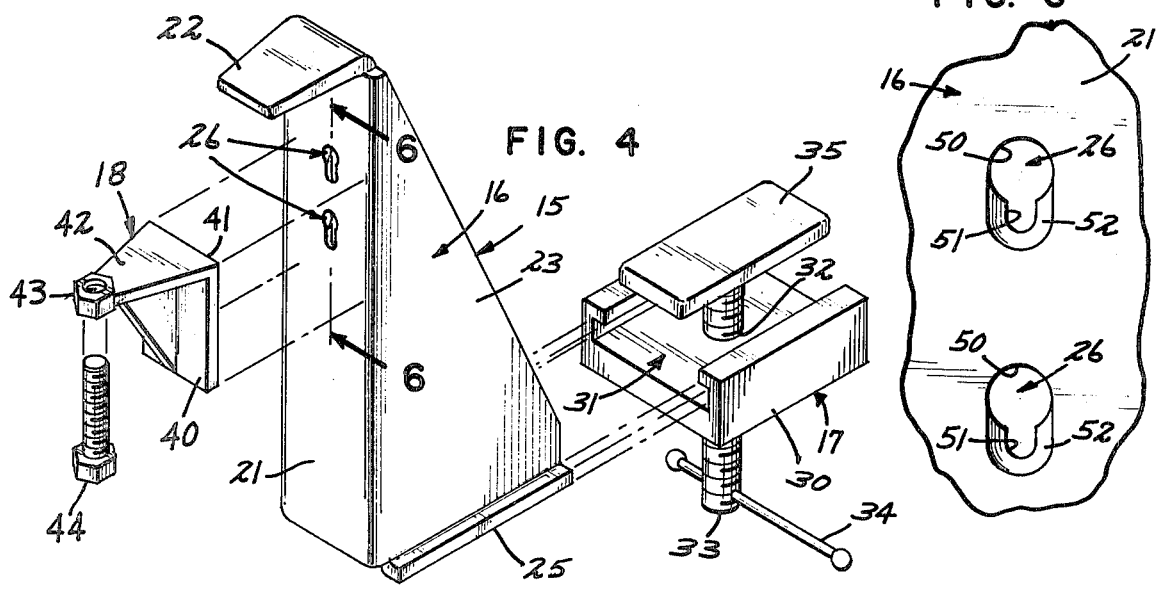
FIG. 4
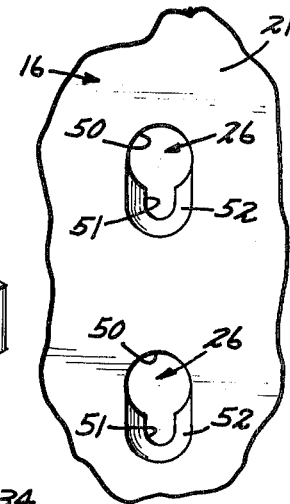
FIG. 6

ADJUSTABLE JOIST HANGER

This is a continuation of application Ser. No. 807,504, filed June 17, 1977, which is a continuation of application Ser. No. 617,498, filed Sept. 29, 1975 both now abandoned.

BACKGROUND OF THE INVENTION

This invention relates to the field of construction work, and comprises a new method and means for constructing concrete decks over spaced longitudinal beams of steel or concrete. While of general utility, my invention is most useful in bridge construction, and is illustrated in that use.

A well known way of constructing concrete decks which are to be upheld by longitudinal beams supported on columns or piers or in any other suitable fashion, involves supporting a plurality of straining members on the lower flanges of two spaced successive beams. Jack screws rest on each straining member near the ends thereof, and support timber bearers. The joists of the deck support sheathing are carried on the bearers: they lie parallel to the underlying beams and extend above them, as adjusted by the jack screws, to make the deck thickness greater over the beams than over the spaces between them. Sheathing panels are laid on top of the hoists, filler strips are added at the ends of the joists if necessary, and the concrete is poured and finished.

For installations where the transverse beams are of steel, it has often been necessary to use sacrificial members temporarily welded to the beams and later cut off and discarded: in a structure as large as a bridge, this becomes a not negligible element of cost and wastage.

After the concrete has set, the jack screws are loosened, so that the bearers allow the joists to move downward from the sheathing panels, the latter normally remaining in engagement with the undersurface of the concrete. The joists are removed, then the bearers, jack screws, and straining members, after which as many as possible of the sheathing panels and filler strips are salvaged for reuse.

SUMMARY OF THE INVENTION

The present invention comprises a new joist hanger and a new method of deck construction which the new hanger makes possible. The hangers are arranged to rest on, or if desired are clamped to, the upper flanges of the transverse beams, and are configured to receive the ends of joists directly, thus dispensing with the straining members and bearers. The joists are adjustable vertically in the hangers to give a deck elevation for the sheathing required by the building plan. After the concrete has set, the hangers disassemble readily to allow the joists to be lowered through them, whereupon the hangers are removed from the beams leaving inconspicuous shallow horizontal holes around the joint between the beam and the deck. A special advantage of this arrangement is that joists can always be handled one at a time, both in placement and in removal, and are maintained reliably in their on-edge position. Moreover, the need for large quantities of timber in the form of bearers and straining members is obviated.

Various advantages and features of novelty which characterize my invention are pointed out with particularity in the claims annexed hereto and forming a part hereof. However, for a better understanding of the invention, its advantages, and objects attained by its use, reference should be had to the accompanying descriptive matter, in which there is illustrated and described a preferred embodiment of the invention.

BRIEF DESCRIPTION OF THE DRAWING

In the drawing,

FIG. 1 is a fragmentary view taken in longitudinal section of a concrete deck being constructed according to my invention, the section cutting a concrete supporting beam transversely;

FIG. 2 is a view like FIG. 1 in which the supporting beam is a steel beam;

FIG. 3 is a sectional view along the line 3—3 of FIG. 1, to a larger scale;

FIG. 4 is an exploded view showing the parts making up my new hanger; and

FIGS. 5 and 6 show details to a larger scale.

DESCRIPTION OF THE PREFERRED EMBODIMENT

Referring first to FIGS. 1 and 3, reference numeral 10 represents a concrete supporting beam having an upper flange 11 with a flat surface 12 and a web 13. It is understood that similar supports exist to the left and to the right of the one shown. Joists 14 are supported on surface 12 by joist hangers 15, better shown in FIG. 4.

Hanger 15 comprises a body 16, joist support means 17, and positioning means 18. (See FIG. 2). Body 16 may be made in any appropriate fashion: I prefer that it be a stamping. It includes an elongated flat member 21 formed at one end with a support member or lip 22 projecting in a first direction from the surface of the metal. Extending in the opposite direction from the flat member are a pair of parallel walls 23, 24 spaced by the thickness of a joist. A pair of ribs 25 project outwardly from walls 23, 24 at the end of the body 16 remote from lip 22. Member 21 has a pair of apertures 26 of special configuration for a purpose which will presently appear.

Joist support means 17 is shown to comprise a carriage 30 having a T-slot 31 to receive the ribs 25 of body 16, along which carriage 30 is free to slide. Carriage 30 is centrally bored and tapped as at 32 to pass an adjusting screw 33 having a handle 34 and a swivelled joist contacting head 35.

Positioning means 18 functions to prevent the lower portion of the hanger from swinging away from joist 14. It preferably comprises a bracket 40 having a flat surface 41 adapted to engage the surface of member 21 in the area of apertures 26, and an arm 42 carrying a threaded socket 43 for a clamping screw 44. The axis of screw 44 is parallel to surface 41. As shown in FIGS. 5 and 6, a pair of inwardly tapering studs 45 project from surface 41, and are spaced the same as apertures 26 in member 21. Each of these apertures is a keyhole slot and can be described as the intersection of a round hole 50, which will pass the head of a stud 45, with a slot 51 bordered by a tapered wall 52, the angle of the taper 52 being the same as that of studs 45. When bracket 40 is placed against member 21 so that studs 45 pass through apertures 26 and then allowed to move downwardly as seen in FIG. 6, the tapered surfaces of member 52 and stud 45 cooperate to draw bracket 40 into close connection with the body 16. In this position, the axis of screw 44 is perpendicular to lip 22. As shown in FIG. 2, the spacing between lip 22 and screw 44 is such that, when lip 22 is rested on a surface such as the upper flange 60 of a steel beam 61 having a web 62, screw 44 may engage the under surface of the flange and clamp body 16 in a more secure position than is obtainable by gravity in FIG. 1, and welding is thus avoided.

The hanger just described may be used to practice a new method of construction of concrete decks. Referring back to FIGS. 1 and 2, the first step is to place hangers along the upper flange of beam 10 and the next beam along the space to be decked. A joist 14 is now lowered into the space between walls 23 and 24 at each end, until its ends rest on heads 35. The joists are, of course, precut to a length slightly less than the distance between the hangers, and when a joist is placed the hangers at each end are retained in position. Notice that only one joist needs to be manipulated at one time, and no intricate spatial relation of a large number of joists must be continually maintained.

The step just described is repeated as often as is necessary until the area to be decked is fully covered by supporting joists 14. The next step is to apply sheathing panels 70 to the top surfaces of the joists. The joists are construction lumber and may vary in dimensions: adjustment of the screw 33 associated with each joist makes it possible to bring the top surfaces of all to plan elevation. For ease in later form removal, panels 70 are secured only minimally to joists 14, preferably by light nailing.

It is now necessary to apply sealing strips 72 along the ends of the joists to prevent leakage of concrete through these spaces. Again a minimum securement leads to ease in disassembly.

The structure is the same whether used with a concrete beam as shown in FIG. 1, or a steel beam as shown in FIG. 2, except that in the latter case the hangers may be clamped in position, to maintain the hanger in a position normal to the top flange, whereas in the former case they are held by the outside surface of the top flange.

The concrete may now be poured and finished on its upper surface.

After the concrete has set, the joists 14 are individually removable simply by loosening screws 35 and sliding carriages 30 off ribs 25 of the hangers, thus leaving a clear space for downward joist removal. Sealing strips 72 and sheathing panels 70 generally adhere to the concrete at this stage, even when a parting compound has been used preparatory to pouring. If clamping means 18 are used, the next step is to remove them after loosening screws 44. The hangers are now retained solely by the sockets formed about lips 22 by the concrete, and are easily removed by a few light hammer blows. In this regard, and with specific reference to FIG. 4, it will be noted that the lip 22 defines sides or edges that converge over their entire projecting link in a direction away from the elongated flat member 21. As shown in FIGS. 1 and 2, the lip 22 also defines flat top and bottom surfaces that converge over their entire projecting length in a direction away from the flat elongated body 31. Sealing strips 72 and sheathing panels 79 may be stripped off the concrete, as before, and salvaged as far as possible.

In a structure having a number of areas of like size and shape to be decked, a large proportion of the wooden components can be used repeatedly.

From the foregoing, it will be evident that I have invented a new and useful joist hanger by means of which the construction of concrete decks is greatly simplified. The hangers are reusable, inexpensive, simple, easy to use, and permit rapid adjustment of joists to a plan elevation. The new method of construction avoids the assemblages of heavy timbers found necessary in the past, and by its use each joist may be set and removed independently.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A joist hanger comprising, in combination:
    (a) a body including an elongated flat member;
    (b) a support member projecting perpendicularly from the face of said member, in a first direction only, at one end thereof;
    (c) and a pair of parallel walls projecting from said flat member in the opposite direction only and mutually spaced by the thickness of a joist;
    (d) joist support means carried by said walls at the end of said body remote from said lip and adjustably projecting between said walls and parallel to said body;
    (e) and clamping means removably carried by said flat member and adjustably parallel to said flat member for cooperating with said support member to secure said hanger orthogonally to an object such as the flange of a steel beam.

2. The structure of claim 1 in which said clamping means includes an externally threaded member and a bracket attachable to said flat member and having a threaded aperture to mount said threaded member with its axis perpendicular to said support member.

3. The structure of claim 2 together with keyhold slot means for removably connecting said bracket to said flat member.

4. A joist hanger comprising, in combination:
    (a) a body including an elongated flat member;
    (b) a lip projecting perpendicularly from the face of said member in a first direction at one end thereof;
    (c) a pair of side walls projecting from said flat member in the opposite direction and mutually spaced by the thickness of a joist;
    (d) joist supporting means carried by said walls at the end of said body remote from said lip;
    (e) a bracket having a threaded aperture;
    (f) an externally threaded member received in said aperture;
    (g) and means including a keyhole slot connection for removably mounting said bracket to said body so that the axis of said threaded aperture is perpendicular to said lip.

5. A joist hanger for use in the construction of bridge decks and the like comprising:
    (a) a body comprising first and second wall members connected in spaced relation to define a channel therebetween, said body being capable of orientation with the channel generally vertically disposed so that one end of a substantially horizontal joist may be received on edge within the channel;
    (b) said channel being open at the upper end thereof to permit the joist to be positioned with its upper edge elevated from said body, whereby a plurality of similarly arranged joists may together define a horizontal plane upon which a bridge deck or the like may be constructed;

(c) support means associated with the body for permitting the body to be suspended from a substantially horizontal support surface, the support means comprising a substantially flat lip projecting transversely of said body and disposed proximate its upper end, the lip being substantially flat and defining sides that converge over their entire projecting length in a direction away from the body;

(d) adjustment means removably carried by the body for supporting a joist on edge in the channel, and for adjustably raising and lowering the joist within the channel, whereby the joist may be adjustably elevated to said horizontal plane;

(e) and clamping means carried by the body for cooperating with the support means to clamp the joist hanger to an object such as the flange of a steel beam.

6. The joist hanger defined by claim 5, which further comprises
(a) a pair of outwardly directed ribs projecting from said wall members at the ends thereof remote from said lip;
(b) and the adjustment means comprises
  (i) a carriage supported by and movable along said ribs to span the space between said walls;
  (ii) and means carried by the carriage and projecting between the walls for engaging the edge of a joist disposed between the walls at a variable distance from said lip.

7. The joist hanger defined by claim 5, wherein the first and second wall members are spaced in substantially parallel relation by the thickness of a joist.

8. The joist hanger defined by claim 5, wherein the body further comprises an elongated member defining a substantially flat forward face constructed to supportably rest against a vertical surface.

9. The joist hanger defined by claim 8, wherein the flat lip projects perpendicularly from said flat forward face.

10. The joist hanger defined by claim 9, wherein the lip has a flat undersurface disposed perpendicularly to said flat forward face, the lip being disposed at the upper end of the body.

11. The joist hanger defined by claim 8, wherein the first and second wall members are triangular in shape.

12. The joist hanger defined by claim 5, wherein the lip defines substantially flat top and bottom surfaces that converge over their entire projecting length in a direction away from the body.

13. The joist hanger defined by claim 5, wherein the clamping means is removably carried by said body below the lip and adjustable relative thereto to clamp said object therebetween.

14. A joist hanger for use in the construction of bridge decks and the like comprising:

(a) a body comprising first and second wall members connected in spaced relation to define a channel therebetween, said body being capable of orientation with the channel generally vertically disposed so that one end of a substantially horizontal joist may be received on edge within the channel;

(b) said channel being open at the upper end thereof to permit the joist to be positioned with its upper edge elevated from said body, whereby a plurality of similarly arranged joists may together define a horizontal plane upon which a bridge deck or the like may be constructed;

(c) support means associated with the body for permitting the body to be suspended from a substantially horizontal support surface;

(d) adjustment means carried by the body for supporting a joist on edge in the channel, and for adjustably raising and lowering the joist within the channel, whereby the joist may be adjustably elevated to said horizontal plane;

(e) and clamping means carried by the body for cooperating with the support means to clamp the joist hanger to an object such as the flange of a steel beam.

15. The joist hanger defined by claim 14, wherein the clamping means is removably carried by said body below the support means and adjustable relative thereto to clamp said object therebetween.

16. The joist hanger defined by claim 14, wherein the support means comprises a substantially flat lip projecting transversely of said body and disposed proximate its upper end, the lip being substantially flat and defining sides that converge over their entire projecting length in a direction away from the body.

17. The joist hanger defined in claim 16, wherein the lip defines substantially flat top and bottom surfaces that converge over their entire projecting length in a direction away from the body.

* * * * *